INVENTORS
MURRAY A. LUFTGLASS
JIMMY E. MC CLARY

3,413,249
COLORING OF POLYSTYRENE
Murray A. Luftglass, Cheshire, and Jimmy E. McClary, Wallingford, Conn., assignors to Shell Oil Company of New York, N.Y., a corporation of Delaware
Filed June 22, 1964, Ser. No. 376,810
6 Claims. (Cl. 260—23)

ABSTRACT OF THE DISCLOSURE

A particulate toned masterbatch and process of making and using the same wherein the masterbatch consists of a single pigment uniformly dispersed in a thermoplastic polymer particle said particle having deposited on its surface toning pigments, dispersion agents and from 0.2–0.8% by weight of water.

---

This invention relates to an improved method of continuously producing colored thermoplastic polymers in conventional processing equipment. More particularly, the invention relates to a method of coloring thermoplastic polymers, and in particular to a method of coloring polystyrene wherein a toned masterbatch, selected from a wide range of colors, including the dark colors, is made available for metering into the polymer stream of the extruder. The toned masterbatch and polymer are mixed in the extruder and the resulting composition passed through the extruder to form colored strands of polymer; the strands thereafter being pelletized.

This invention is an improvement to the invention described in copending application, U.S. Ser. No. 376,833, filed June 22, 1964, of Luftglass. That application describes a process of coloring thermoplastic polymers wherein a toned masterbatch is also introduced into the polymer stream during extrusion thereof. The toned masterbatch composition of the copending application comprises a single pigment masterbatch blended with toning pigments and dispersing agents. The single pigment masterbatch consists of an intimate mixture of thermoplastic polymer and pigment. The thermoplastic polymer coloring methods of this invention and of U.S. Ser. No. 376,833, filed June 22, 1964, possess distinct advantages over the batch post and continuous post coloring operations. These advantages are enumerated in said copending application.

It was discovered, however, that the toned masterbatch composition described in copending application Ser. No. 376,833, filed June 22, 1964, gave rise to dusting problems due to the fluffy nature of dispersing aids and pigments. Dusting causes some contamination of the production areas, but primarily reduces color uniformity of masterbatch blends. Dusting, therefore, seriously limits the range of colors that can be produced by toned masterbatch since it limits the concentration of toning pigments, thereby, depending on the particular toning pigment, eliminating the production of all dark and even some light colors which require more toning pigment in a blend.

Figure 1:
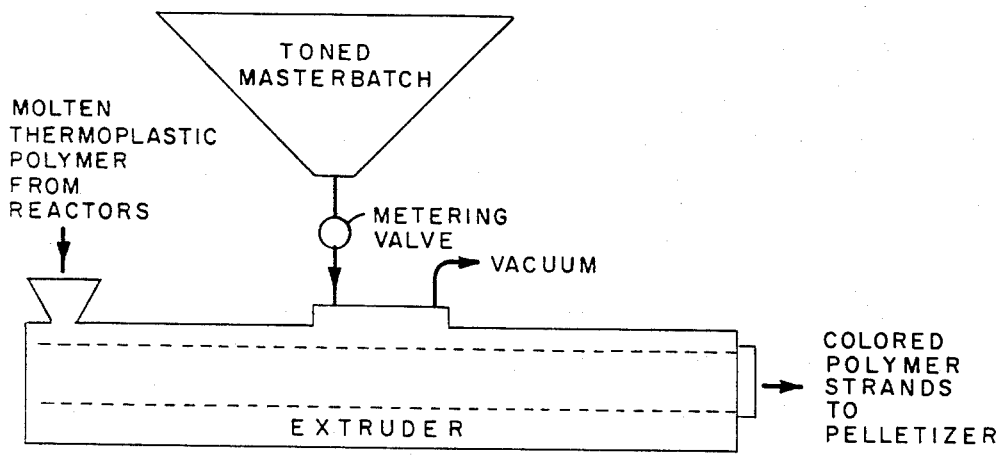
Figure 2:
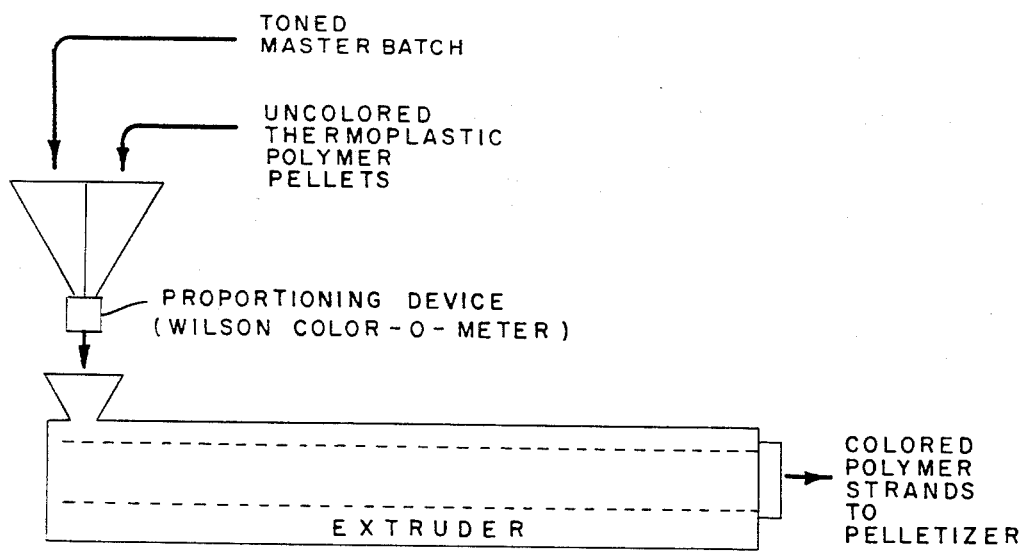

It is an object of this invention to provide an improved method of continuously producing colored thermoplastic polymers in conventional processing equipment. It is a further object to provide a coloring method for thermoplastic polymers wherein a wide range of colors may be employed. It is still a further object to provide a novel toned masterbatch which eliminates the dusting problem and thereby permits production of a wide range of colors for even critical applications, such as assembled component appliance parts, in the polystyrene coloring process. Other objects and advantages of this will become apparent to one skilled in the art from the accompanying disclosure and discussion and attached drawings wherein FIGURE 1 is a schematic diagram showing a devolatilizing extruder and FIGURE 2 is a schematic diagram showing a past coloring extruder.

It has been discovered that these and other objects may be accomplished by adding to a toned masterbatch composition, e.g., the toned masterbatch described in Ser. No. 376,833, filed June 22, 1964, an amount of water which will prevent dusting. The amount of water necessary to prevent dusting will depend upon the amount of dispersing agents and pigments present, but is normally on the order of 0.1% by weight based on the total masterbatch blend. While water is the preferred wetting agent because the concentrations required to eliminate dusting are relatively low, organic liquids, such as mineral oil, butyl stearate, dibutyl phthalate, styrene, and Igepal CO–630 (polyoxyethylated nonylphenol such as described in U.S. Patent No. 2,441,341), which are compatible with thermoplastic polymers and may be derived as lubricant or plasticizer, may be substituted for water.

According to this invention, dusting is eliminated by addition of a small amount of water to the toned masterbatch composition prior to use in the thermoplastic polymer process and subsequent to the addition of the other components of the toned masterbatch. Except for the addition of water to the toned masterbatch of this invention, the steps of preparing the masterbatch and addition of masterbatch to the extruder of this invention are substantially the same as described in Ser. No. 376,833, filed June 22, 1964. The disclosure of said application, which is pertinent to the disclosure of this invention is incorporated herein by reference.

The thermoplastic polymers which may be colored according to the process of this invention are relatively high molecular weight, linear polymers, characterized in that they are capable of being extruded within a temperature range verying from about 50° to 300° C. Examples of these thermoplastic polymers are: acetal resins, acrylics, cellulose acetate, cellulose acetate butyrate, ethyl cellulose, polyfluorocarbons, nylons, polycarbonates, polyethlenes, polypropylenes, poylstyrenes and vinyl polymers.

The thermoplastic polymers of particular interest are the polymers of monomers possessing a

group, such as, for example, polystyrene, polypropylene, polymethylmethacrylate, polyvinylchloride, polymethylacrylate, polymethylstyrene, polyethylene, and copolymers and interpolymers of styrene, such as an interpolymer of 5% methylmethacrylate, 30% methylstyrene and 60% methacrylonitrile, and copolymers of methylmethacrylate such as aconitrile, and copolymers of methylmethacrylate, such as a copolymer of 25% methacrylonitrile and 75% methylmethacrylate.

The thermoplastic polymers of special interest are polystryene, polypropylene and polymethylmethacrylate.

Polypropylene preferred for use in the coloring process of this invention consists predominantly of crystallizable stereoregular, and particularly of isotactic polypropylene. Stereoregular polypropylene means solid polypropylene having a high degree of stereoregularity, reflected in at least 50% crystallinity when solidified under conditions which favor crystallization. The viscosity average molecular weight of stereoregular polypropylene is usually at least about 40,000 and generally between 100,000 and 1,600,000. The intrinsic viscosity, measured in Decalin at 150° C. and expressed in deciliters per gram, may be as low as 0.8 or as high as 7 or more.

As used herein, the term "toned masterbatch" denotes a composition consisting of single pigment masterbatch, toning pigments, a wetting agent, and dispersing agents. The term "single pigment masterbatch" denotes a composition consisting of thermoplastic polymer and pigment.

According to the method of this invention, it is now possible to provide colored thermoplastic polymer selected from a wide range of colors. A more limited range of colors is available employing the coloring process of Ser. No. 376,833 filed June 22, 1964. The expanded range of colors provided by this invention is made possible by high loadings of toning pigments and without major change in procedure or equipment, simply by the addition of small amounts of water to the masterbatch composition of Ser. No. 376,833 filed June 22, 1964.

It has also been found that the method employed in preparing the toned masterbatch is critical to the thermoplastic polymer coloring process. Thus, it was found that blending of dry pigments with dispersing agents to form a pigment masterblend and metering the blend to the extruder with natural thermoplastic polymer pellets resulted in colored product with poor pigment dispersions. This poor dispersion encountered with blended pigments is attributed to the lack of means available to break up the pigment agglomerates. An effective method has been discovered for preventing agglomeration of the pigment. The method consists of coating the surface of a single pigment masterbatch with toning pigments to obtain a color-adjusted toned masterbatch. Dispersion of the toning pigments in the toned masterbatch is achieved with the aid of dispersing agents.

The toned masterbatch of this invention, therefore, consists of four essential ingredients, (1) single pigment masterbatch, (2) toning pigments, (3) dispersing agents, and (4) a wetting agent.

SINGLE PIGMENT MASTERBATCH

A single pigment masterbatch is a solid dispersion of a single pigment such as titanium dioxide, cadmium red, ultra-marine blue, carbon black, etc., in thermoplastic polymer prepared in a high shear mill, Banbury mill or extruder. Various additives such as mineral oil and dispersing agents may be included to simplify processing. Single pigment masterbatches may be purchased from suppliers who normally make pre-matched pigment masterbatches, the equipment and techniques for preparing both being the same. Manufacture of a single pigment masterbatch is less costly than pre-matched pigment matserbatch since no color control is required.

The thermoplastic polymer serves as a vehicle for the dispersion of the pigment in the masterbatch. A medium-high melt flow thermoplastic polymer is preferred for use in the masterbatch because of its processability. Suitable thermoplastic polymers are those having a melt index (g./10 min. at 200° C.), for example in the case of polystyrene a melt index ranging from about 4 to about 16, determined by the ASTM method number G. The concentration of the thermoplastic polymer in the blend is from about 20% to about 75% by weight, the remainder of the blend consisting of pigment. The final product may be obtained in either the pelletized or chip form. In the pelletized form, the pellets are cylindrical in shape and range in size from pellets having a diameter and length of approximately 3/64 inch to pellets having a diameter and length of approximately 1/8 inch. The chips range in size from those which are 60 mesh fines to those which are 1/4 inch in size.

The single pigment masterbatch may be further diluted to any concentration by either re-extrusion with more thermoplastic polymer or simply by blending with equivalent particle size thermoplastic polymer to increase surface area available for coating with toning pigments. This is normally not desirable since it increases the volume of material that must be processed and can result in non-uniform color due to stratification of the single pigment masterbatch and thermoplastic polymer.

TONING PIGMENTS

Generally, any type pigment which is satisfactory for use in the batch blending post coloring process is acceptable in the pigment masterbatch process, i.e., pigments which are stable in the selected thermoplastic polymer. The particular color of toning pigment used, of course, depends upon the color desired of the product.

The amount of toning pigment which may be coated onto the single pigment masterbatch has, by this invention, been increased, thereby expanding the range of colors to include medium-dark colors. According to the prior method of coloring described in Ser. No. 376,833 filed June 22, 1964, it was not possible to prepare the darker colors since the concentration of the toning pigment in the masterbatch composition was limited due to dusting. Dusting, which causes a change in the ratio of toning pigment to single masterbatch in different portions of the blending drum, results in reduced color uniformity. Thus, it is now possible to prepare darker colors, i.e., those requiring greater amounts of toning pigment.

The toning pigment is blended into the single masterbatch by tumbling. For example, the single pigment masterbatch and toning pigments plus dispersing agents are placed into a 40 to 55 gallon fiber drum, which are tumbled end-over-end or rolled horizontally by commercial equipment.

DISPERSING AGENTS

In order to accomplish complete dispersion of the toning pigments, it has been found necessary to use dispersing agents. Suitable dispersing agents are mixtures of metallic stearates and surface active agents preferably zinc stearate and commercially available Aerosol OTB (85% by weight dioctyl sodium sulfosuccinate and 15% by weight sodium benzoate) in combination. The dispersing agents are added to the single masterbatch at the same time as or immediately prior to the toning pigments and blended therewith.

WETTING AGENT

A wetting agent is included in the toned masterbatch composition to eliminate the problem of "dusting." Dusting results from the fluffy nature of dispersing agents and pigments. It causes some contamination of the production areas, but primarily reduces color uniformity of masterbatch blend since it results in a change in the ratio of toning pigments to single pigment masterbatch in different portions of the blending drum. Dusting seriously limits the range of colors that can be produced since it limits the concentration of toning pigments that can be used in a blend. Attempts to reduce dusting by reducing the level of dispersing agents, while reducing dusting, tends to increase dispersion problems.

It was found that a small amount of water favorably eliminates dusting. Other wetting agents, such as mineral oil, butyl stearate, dibutyl phthalate, styrene, and Igepal CO-630, may be employed, but water proved to be more desirable since lower concentrations are required to eliminate dusting, and because of the ease in its addition to the toned masterbatch. Most of the other wetting agents cause agglomeration of pellets in the drum with a resultant feeding problem.

The water is added to the blending drum after the pigment has been dispersed onto the single pigment masterbatch. The amount of water necessary to prevent dusting varies depending upon the amount of dispersing agents and pigments present, but is normally on the order of 0.1% by weight based on the total masterbatch blend. However, the concentration of water in the masterbatch may vary from .02% to 0.8%. The preferred concentrations of water are in the range of 1/3 to 1/2 cc. (cubic centimeter) per pound of toned masterbatch, i.e., 0.0735 to 0.22% by weight. However, different concentrations may be required depending upon the type and amount of toning pigment present. In a vented extruder this water is driven off. In an unvented extruder about 0.005% by weight of the final product is attributed to this water, less than the normal water absorption of polystyrene.

Referring to FIGURE 1 which shows the addition of toned masterbatch to a devolatilizing extruder, molten thermoplastic polymer from the reactor enters the rear portion of the extruder through a hopper. Simultaneously therewith toned masterbatch is added to the molten polymer in the devolatilizing zone of the extruder through a vent opening by means of a metering device. In this zone, the molten polymer and toned masterbatch are mixed to form colored, molten polymer which leaves the extruder through a die in the form of colored strands of thermoplastic polymer.

Referring to FIGURE 2 which shows the addition of toned masterbatch to a post-coloring extruder, thermoplastic polymer pellets and toned masterbatch are metered through a proportioning device into a single stream which is fed into the rear portion of the extruders via a feed hopper. Within the extruder the thermoplastic polymer and toned masterbatch are heated to form a molten mass which is metered into a decompression zone by means of a screw. In the decompression zone, the polymer and toned masterbatch are mixed to form a colored, molten mass which leaves the extruder through a die in the form of colored strands of thermoplastic polymer.

This invention provides a coloring technique for use in a continuous process for producing and extruding thermoplastic polymers, and provides for the use of a widely expanded range of color selections including medium-dark colors. These colors are acceptable in color uniformity for even the most critical applications including assembled component appliance parts. The production and processing of thermoplastic polymers prior to the extrusion thereof are well known in the art. For example, in the production of polystyrene, continuous bulk polymerization may be employed and carried out in various types of equipment. For a more detailed description of the polymerization of styrene, reference is here made to chapter 7 of "Styrene, Its Polymers, Copolymers and Derivatives" by Boundy and Boyer, published by Reinhold Publishing Corporation, New York (1952).

The toned masterbatch process of this invention may be metered into the feed port or vacuum vent opening, referred to as the open zone, of all types of devolatilizing (vented) extruders (FIGURE 1) or it may be metered into the feed port of other extruders (FIGURE 2). The degree of mixing required in the extruder depends on the particular extruder, the relative flow rates of the materials, and the final product application. However, it has been possible to make commercially acceptable product with this process when masterbatch was added as few as 6 diameters from the extruder die.

Various methods may be employed to accomplish the addition of the toned masterbatch to the extruders. A preferred means for the addition of the toned masterbatch when employing a devolatilizing extruder is via a standard Jamesbury ball valve especially adapted to permit addition of solids to the vacuum changer. A complete disclosure of the Jamesbury ball valve and modifications thereto and its operation in the masterbatch on-stream coloring process is described in copending application, U.S. Ser. No. 376,809, filed June 22, 1964.

The following examples illustrate the present invention. It is to be understood that the examples are for the purpose of illustration and the invention is not to be regarded as limited to any of the specific compositions or conditions recited therein.

Example I.—Preparation of single masterbatch compositions

This example illustrates the preparation of a white single masterbatch composition employing a titanium dioxide pigment. The concentrate is composed of 40 parts crystal grade polystyrene having high flow characteristics, and 60 parts rutile titanium dioxide pigment. The pigment is intimately dispersed in the polystyrene by using high shear equipment such as the Banbury mill. The hardened masterbatch is then reduced to smaller size by either extrusion into pellets or grinding into chips.

Example II.—Preparation of toned masterbatch composition

The toned masterbatch compositions are blended and color adjusted to specification in 200-pound fiber drums or small double cone blenders in the laboratory prior to submission to the plant for use in the process. A typical masterbatch formulation and procedure for its preparation is as follows:

To a 1200-pound double cone blender containing 330 pounds of a single pigment masterbatch consisting of 70% polystyrene and 30% titanium dioxide is added 0.14 pound of zinc stearate and 0.14 pound of Aerosol OTB. After blending the mixture for 15 minutes, 0.24 pound of oil blue, 0.18 pound of phthalocyanine green, 0.05 pound of oil red and 0.05 pound of cadmium yellow toning pigment are added and the mixture blended for an additional 30 minutes. One hundred fifty cc. of water is now added (0.45 cc. water per pound of single masterbatch blend) and blended for 15 minutes. A color check is made at this time by double extrusion of the toned masterbatch with polystyrene at a ratio of 3.0 to 100. If necessary, pigment adjustments are easily effected by adding pigment and proportional amounts of zinc stearate and Aerosol OTB and blending for 30 minutes after each adjustment. Additional water, as required to eliminate dusting, is then added, and the mixture is blended for 15 minutes.

Example III.—Comparison

Example II was repeated except that the water was omitted from the toned masterbatch composition. Although concentration of pigments was relatively low, examination of the blending drum and color checks taken from various points in the drum revealed that dusting had occurred and there was considerable variability in the color of final product made from masterbatch taken from different portions of the blending drum. Dusting indicated that the concentration level of this mixture of toning pigments was too high in the absence of water (concentration of pigments that can be added before an intolerable dusting level is reached depends on the particular pigments and combination of pigments and the color uniformity required in the final product). Therefore, the introduction of the toned masterbatch composition prepared in Example III into the extruder produced a product of unacceptable color uniformity.

Example IV

The procedure of Example II is repeated except that the following formulation is used:

To a 200-pound fiber drum containing 55 pounds of 30% titanium dioxide single pigment masterbatch and 55 pounds of uncolored pelletized polystyrene is added 0.21 pound of zinc stearate and 0.21 pound of Aerosol OTB, 0.38 pound of cadmium yellow, 3.6 pounds titanium yellow, 0.05 pound of carbon black, 0.24 pound of cadmium red "A," and 0.24 pound of cadmium red "B" toning pigments and 30 cc. of water.

The above examples illustrate the preparation of the toned masterbatch and single pigment masterbatch and it is understood that other pigments may be substituted for titanium dioxide, such as red, yellow, blue, green, etc., other commercially available dispersing agents may be substituted for the zinc stearate and Aerosol OTB or other toning pigments or combinations thereof may be used in place of the one illustrated above without deviating from the invention.

Examples V–VII

Examples I, II, and IV are repeated except that in each example polypropylene is substituted for polystyrene. In each of the examples a product is produced having acceptable color uniformity.

Examples VIII–X

Examples I, II, and IV are repeated except that in each example polymethylmethacrylate is substituted for polystyrene. In each of the examples the product formed had acceptable color uniformity.

Example XI.—Continuous on-stream coloring of polystyrene

Molten polystyrene leaving the last reactor of a continuous polymerization system enters the devolatilizing extruder at a temperature of approximately 400° F. The toned masterbatch composition containing water, prepared in Examples II or IV, is metered into the polystyrene stream in the open zone of the devolatilizing extruder during extrusion by means of a Jamesbury ball valve at a rate required to obtain the desired opacity. The colored polystyrene leaves the extruder in the form of strands which are chopped into pellets and packaged.

Similar results are obtained when either polypropylene or polymethylmethacrylate is substituted for polystyrene.

Example XII.—Continuous post coloring of polystyrene

Uncolored polystyrene pellets and toned masterbatch are proportionally fed to an extruder on a continuous basis for a given color run. One commercial device used for metering the two feeds is the Wilson Color-O-Meter, manufactured by Wilson Products, Neshanic, N.J.

Uncolored pelletized polystyrene is fed from one feed hopper of the Color-O-Meter, and the toned masterbatch from Examples II or IV or the single pigment masterbatch from Example I is metered from a second feed hopper at a rate required for the desired opacity. The two streams are mixed by the Color-O-Meter and are fed into the extruder hopper. The colored polystyrene leaves the extruder in the form of strands which are chopped into pellets and packaged. Similar results are also obtained when either polypropylene or polymethylmethacrylate is substituted for polystyrene.

While the above examples illustrate continuous on-stream coloring of polystyrene with the toned masterbatch compositions of Examples II, IV and V to X any toned masterbatch consisting of a single pigment masterbatch coated with selected toning pigments and containing a small amount of water will produce favorable results when used in the procedure of Examples I, IV, and V to X. Continuous coloring of other thermoplastic polymers can be accomplished merely by substituting the thermoplastic polymer for polystyrene in Examples IX and X.

We claim as our invention:

1. A process for preparing a particulate toned masterbatch composition which comprises the steps of (1) co-mixing a thermoplastic polymer and a pigment to form particles of a single pigment masterbatch, (2) adding to the single pigment masterbatch solid dispersing agents and toning pigments, (3) blending for a sufficient time to form a dry homogeneous toned masterbatch composition and (4) subsequently adding to the homogeneous blend 0.02–0.8% of water.

2. A process according to claim 1 wherein the single pigment masterbatch consists of polystyrene and titanium dioxide.

3. A process according to claim 2 wherein the amount of polystyrene present varies from about 20% to 75% by weight of single pigment masterbatch.

4. A process for manufacturing a colored thermoplastic polymer which comprises the steps of:
   (1) co-mixing and thereafter comminuting a thermoplastic polymer and a pigment to form a particulate single pigment masterbatch,
   (2) depositing on the surfaces of the single pigment masterbatch solid dispersing agents and toning pigments,
   (3) blending for a sufficient time to form a dry particulate structured toned masterbatch composition,
   (4) adding to the surface deposits 0.02–0.8% by weight of water,
   (5) feeding molten thermoplastic polymer from the last stage of a continuous bulk polymerization process into a devolatilizing extruder said product containing no more than 5% unpolymerized monomer,
   (6) simultaneously metering into the molten polymer streams during extrusion thereof a toned masterbatch composition prepared according to steps 1–4, and
   (7) extruding thermoplastic polymer in the form of a colored product containing about 0.005% by weight of water.

5. The process according to claim 4, wherein the single pigment masterbatch consists of from about 20% to about 75% by weight of a thermoplastic polymer selected from the group consisting of polymethylmethacrylate, polypropylene and polystyrene.

6. The process according to claim 4 wherein the single pigment masterbatch consists of 20–75 parts by weight of polystyrene and 25–80 parts by weight of a pigment and wherein the dispersing agents are zinc stearate and a composition consisting of about 85% by weight of an ester of a sulfonated dicarboxylic acid and about 15% by weight of sodium benzoate.

References Cited

UNITED STATES PATENTS

| | | | |
|---|---|---|---|
| 2,109,592 | 3/1938 | Macht et al. | 260—41 |
| 2,470,001 | 5/1949 | Stobber | 260—41 |
| 2,480,871 | 9/1949 | Connell | 260—41 |

OTHER REFERENCES

"Coloring of Plastics," Imperial Chemistry Industries Ltd., Arnold, Hoffman & Co., Inc., 55 Canal St., Providence, R.I., Dyestuffs Division, 1960, pp. 29–31.

Compounding Ingredients for Rubber by editors of Rubber World, 630 3rd Ave., New York, N.Y., 1961, 3rd edition, p. 90.

DONALD E. CZAJA, *Primary Examiner.*

V. P. HOKE, *Assistant Examiner.*